United States Patent
Chen

(10) Patent No.: US 8,082,421 B2
(45) Date of Patent: Dec. 20, 2011

(54) PROGRAM INSTRUCTION REARRANGEMENT METHODS IN COMPUTER

(75) Inventor: Yi-Peng Chen, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 961 days.

(21) Appl. No.: 11/849,485

(22) Filed: Sep. 4, 2007

(65) Prior Publication Data

US 2008/0201556 A1 Aug. 21, 2008

(30) Foreign Application Priority Data

Feb. 16, 2007 (TW) .............................. 96106090 A

(51) Int. Cl.
*G06F 9/38* (2006.01)
*G06F 9/52* (2006.01)
(52) U.S. Cl. .................. 712/216; 712/217; 712/219
(58) Field of Classification Search .................. 712/216, 712/219, 217
See application file for complete search history.

(56) References Cited

U.S. PATENT DOCUMENTS

| 5,812,810 | A | * | 9/1998 | Sager ............................. 712/216 |
| 5,850,552 | A | * | 12/1998 | Odani et al. .................. 717/156 |
| 5,867,644 | A | * | 2/1999 | Ranson et al. .................. 714/39 |
| 6,138,230 | A | | 10/2000 | Hervin et al. |
| 6,260,190 | B1 | * | 7/2001 | Ju ................................. 717/156 |
| 7,571,302 | B1 | * | 8/2009 | Chen et al. .................... 712/217 |
| 2004/0154006 | A1 | * | 8/2004 | Heishi et al. .................. 717/140 |
| 2004/0199752 | A1 | * | 10/2004 | Winberg et al. .............. 712/225 |

FOREIGN PATENT DOCUMENTS

TW 200703143 1/2007

OTHER PUBLICATIONS

TW Office Action mailed Apr. 2, 2010.

* cited by examiner

*Primary Examiner* — Daniel Pan
(74) *Attorney, Agent, or Firm* — Thomas|Kayden

(57) ABSTRACT

A program instruction rearrangement method calculates the dependency depth of each instruction of a program based on dependency between instructions, based on register access order, and rearranging instructions based on the dependency depth. Additionally, the dependency between instructions can be utilized to locate and remove redundant instructions.

13 Claims, 9 Drawing Sheets

PROGRAM INSTRUCTION REARRANGEMENT METHODS IN COMPUTER

BACKGROUND OF THE INVENTION

1. Field of the Invention

The invention relates to computer techniques, and more particularly to program instruction rearrangement methods.

2. Description of the Related Art

A processor typically utilizes pipelining techniques to simultaneously execute multiple instructions. When an executed instruction in a pipeline uses an operand register which is the output of a former instruction, execution of the instruction is suspended until the former instruction yields the result. An example is given with reference to the following instructions:

101 . add a x y
102 . inc a
103 . dec b
//a=(x+y)+1; b=b−1

With reference to FIG. 1, execution stages of instruction #101 may be classified as:
Fetch instruction #101;
Read x and y;
Add; and
Write to a.

Instruction #102 is fetched in the second stage, followed by the third stage for reading register a, but instruction #101 writes the result thereof to register a at the fourth stage, thus instruction #102 is not able to read register a until the fifth stage. In other words, the input of instruction #102 at the fifth stage depends on the output of instruction #101 at the fourth stage. Additionally, at the fifth stage of instruction #102, instruction #103 is also executed. A total of 8 clocks are required to execute instructions #101~103. If the register read by instruction #102 in the fifth stage is not the register a, because no dependency exists between instruction #102 and the fourth stage of instruction #101, instruction #102 can read register a at the third stage, and instruction #103 can step two stages forward, thus, just a total of 6 clocks are required to execute instructions #101~103.

As can be appreciated through the described example, if not properly arranged, two instructions with dependencies in a pipeline of a processor may reduce execution efficiency.

BRIEF SUMMARY OF THE INVENTION

A program instruction rearrangement method is provided. An exemplary embodiment of a program instruction rearrangement method comprises the following steps. A program to be executed by a computer is retrieved from a storage device. An instruction in the program is retrieved as the current instruction, and a register used by the current instruction and a first action applied to the register by the current instruction are also retrieved. If another instruction, hereafter referred to as the second instruction, applies a second action on the same register before the first action, a dependency is built between instructions of the program based register access order by the current instruction and the second instruction. The dependency depth of each instruction in the program is calculated based on the dependency above. The instruction execution order in the program is rearranged based on the dependency depth of each instruction thereof.

An exemplary embodiment of a program instruction rearrangement method comprises the following steps. A program to be executed by a computer is retrieved from a storage device. An instruction in the program is retrieved as the current instruction. If another instruction, hereafter referred to as the second instruction, applies a second action on a register before the current instruction applies a first action on the same register, a dependency is built between the second instruction and the current instruction in which the second instruction is assigned as an upper level instruction of the current instruction. After each instruction of the program is retrieved in order as the current instruction and dependency thereof is accordingly built, tracing back of all upper level instructions in order, and any traced upper level instruction is set as a member of an instruction group. An instruction not belonging to the instruction group is deleted from the program.

An exemplary embodiment of a program instruction rearrangement method comprises the following steps. A program to be executed by a computer is retrieved from a storage device. An instruction in the program is retrieved as the current instruction, and a register utilized by the current instruction and a first action executed by the current instruction to the register are also retrieved. If another instruction, hereafter referred to as the second instruction, accesses the same register before the current instruction accesses the register, a dependency is built between instructions of the program based on the order in which the current instruction and the second instruction access the register. A redundant move instruction is removed from the program based on the dependency.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the previously described example, instruction #103 has no dependency with any other instructions, thus instruction

103 can be rearranged as the second instruction, and the execution order of the instructions is modified as:

101 . add a x y
103 . dec b
102 . inc a

Figure 1:
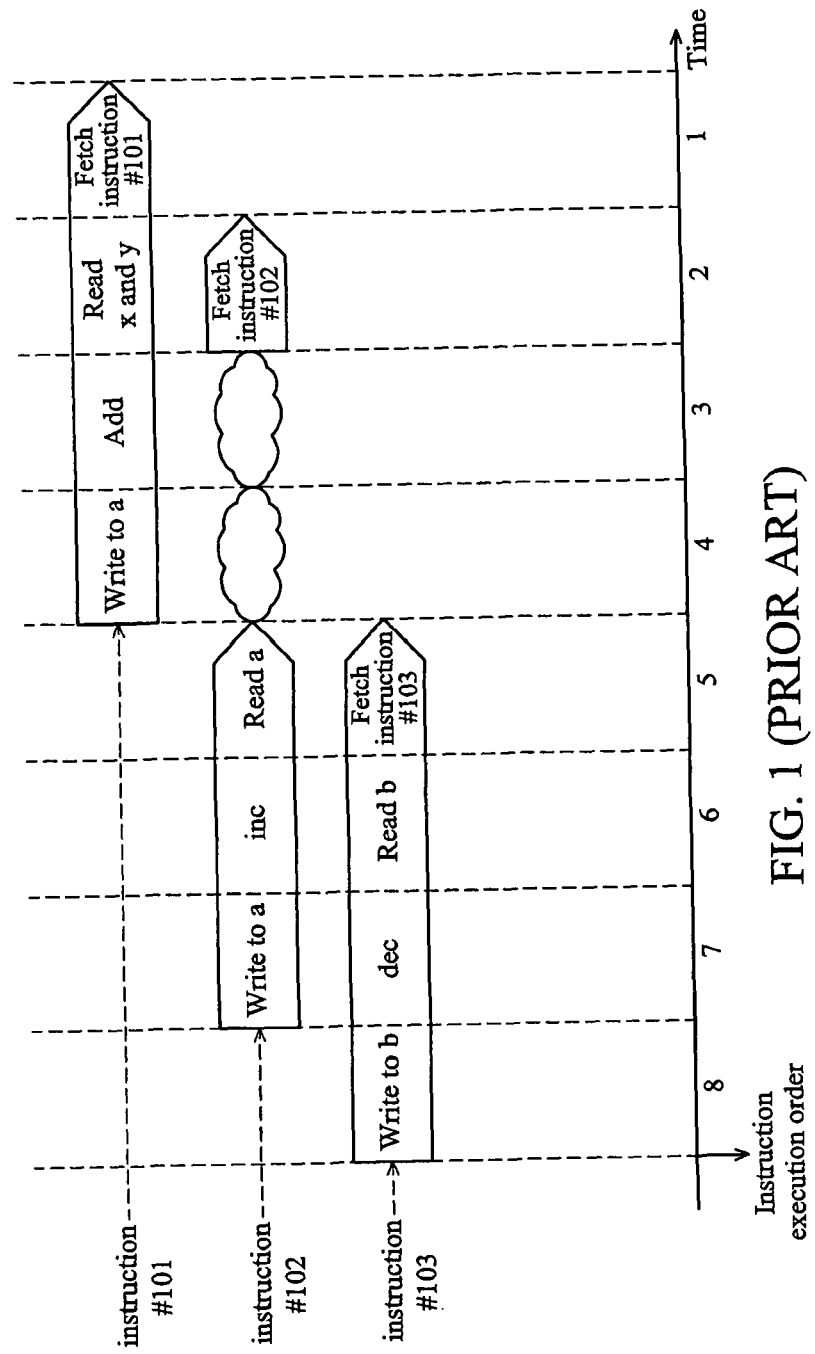
FIG. 1 is a schematic view showing execution stages of a plurality of instructions.
Figure 2:
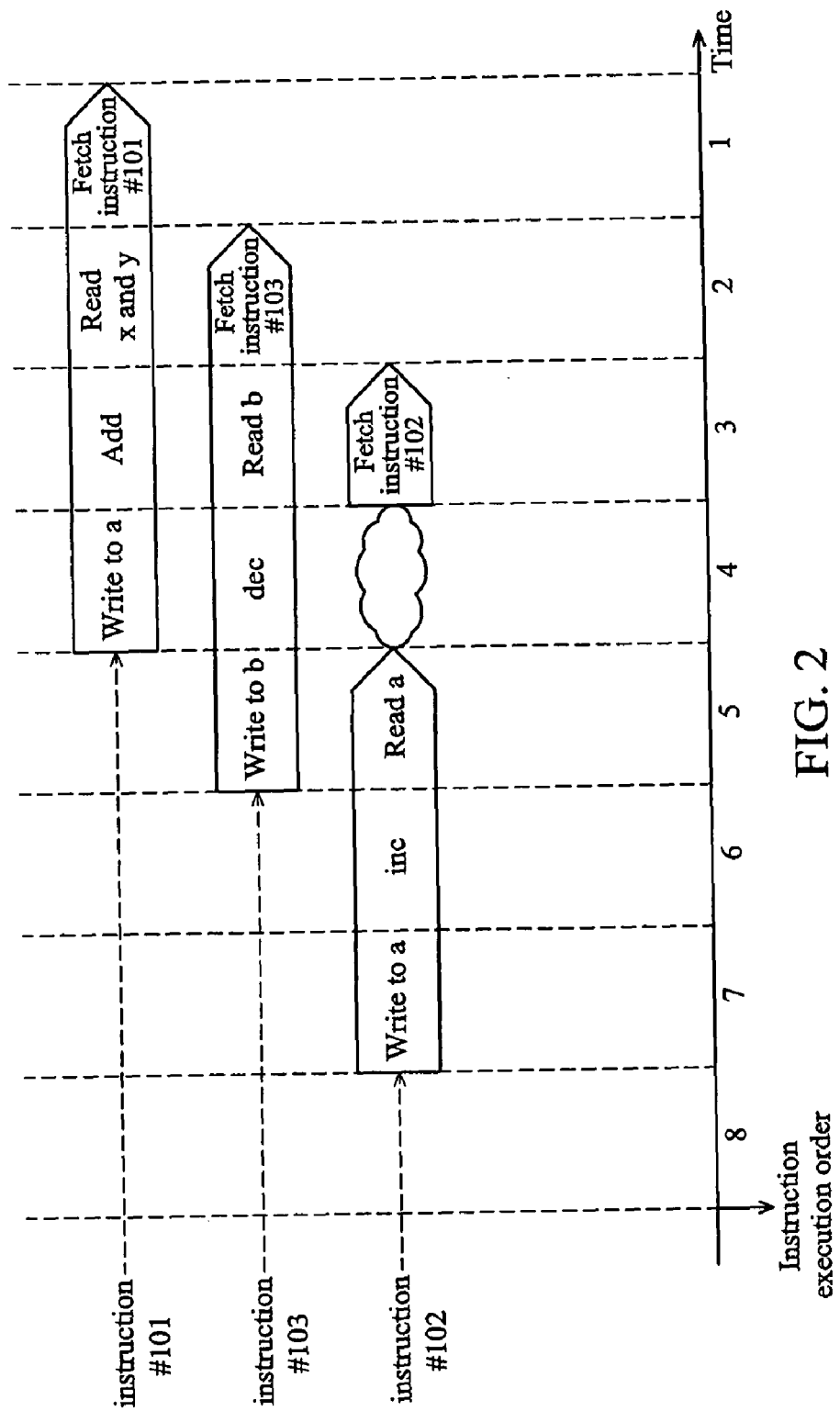
FIG. 2 is a schematic view showing execution stages of the instructions with modified execution order.

FIG. 2 shows execution stages of the instructions with modified execution order, which yields the same result as in the original execution order with only 7 clocks rather than 8. As appreciated, instruction rearrangement, if not affecting program accuracy, may improve program execution efficiency. Accordingly, instruction rearrangement methods are provided in the following.

Figure 3:
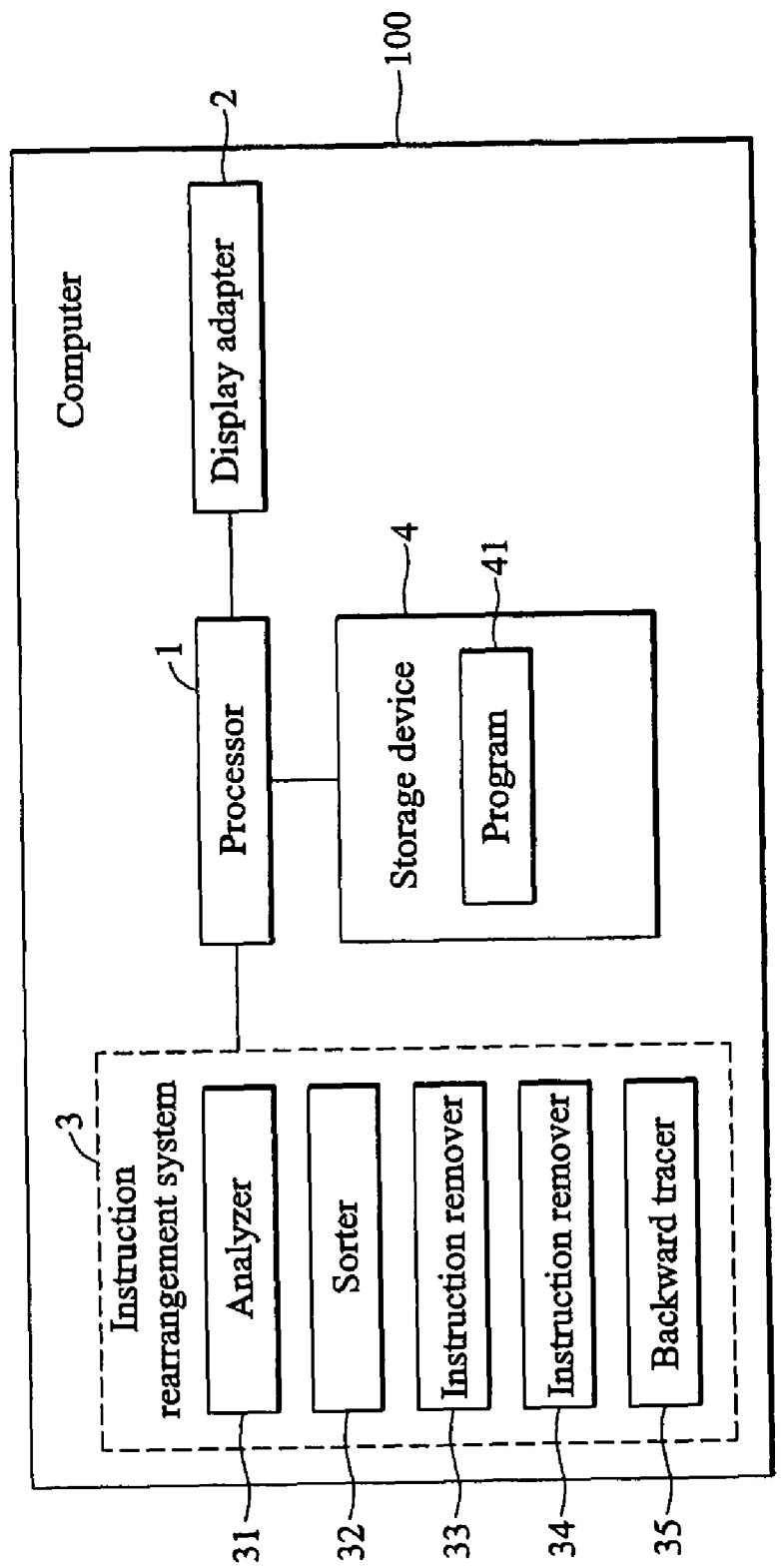
FIG. 3 is a block diagram of the configuration of an exemplary embodiment of a computer.

With reference to FIG. 3, in computer 100, processor 1 is coupled to display adapter 2, instruction rearrangement system 3, and storage device 4. A program 41 may be first processed by instruction rearrangement system 3, and executed by a processor (such as processor 1 or a graphics processing unit (GPU) on display adapter 2) in computer 100 or other electronic devices such as a video game console, a mobile phone, or a personal digital assistant (PDA). Instruction rearrangement system 3 performs program analysis, redundant instruction removal, redundant move instruction removal, and instruction rearrangement, which are respectively implemented by analyzer 31, instruction remover 33, instruction remover 34, and sorter 32. Components of instruction rearrangement system 3 may be implemented by computer programs, hardware, or the combination thereof.

For example, program 41 comprises a shader including the following instruction:

0: texld r0, t0 s0
1: mov r2 r0
2: texld r1, t1 s1
3: mad r3, r0 c0 r1
4: rcp r4, r1
5: mad oC0, r2 r3 c1
6: mov 0C1, r3

Figure 4:
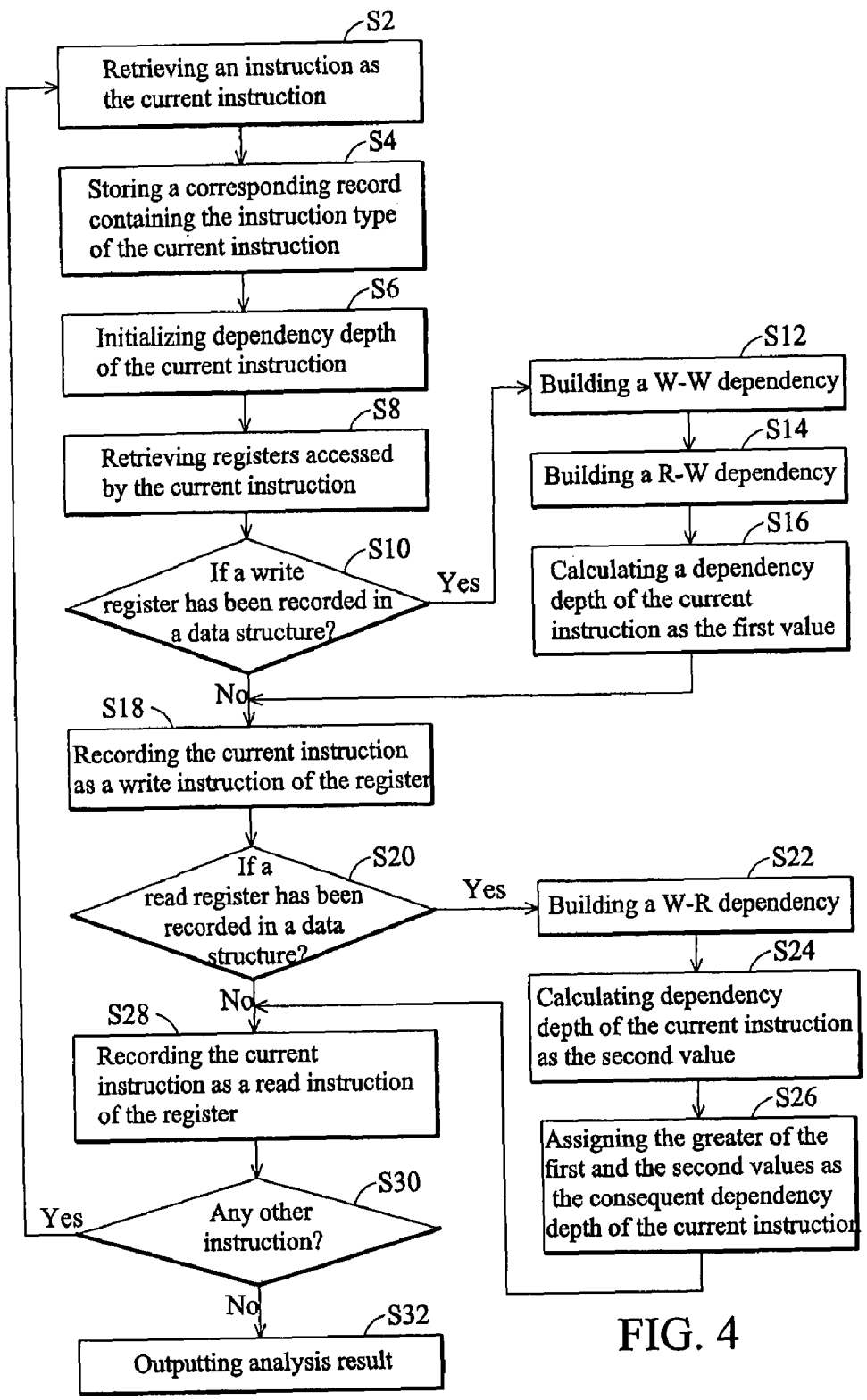
FIG. 4 is a flowchart showing an exemplary embodiment of an instruction dependency analysis method.

With reference to FIG. 4, analyzer 31 analyzes dependency between instructions of program 41. First, analyzer 31 retrieves program 41 and processes an instruction therein as the current instruction (step S2). If the current instruction is a beginning instruction, an output instruction, or a move instruction, analyzer 31 stores a corresponding record containing the instruction type of the current instruction (step S4), wherein the output instruction is the instruction outputting the execution result of program 41. Additionally, as some registers are defined as output registers, an instruction writing an execution result to an output register may be treated as an output instruction.

Analyzer 31 performs an initialization process in step S6, comprising calculating dependency depth of the current instruction. In step S8 registers accessed by the current instruction, including registers to be read and write, respectively referred to read registers and write registers are retrieved. The dependency depths of an instruction may be classified into various types. Dependency depths indicate the order of register access by a plurality of instructions.

An identical register underlying a dependency is accessed between instructions, thus registers used by instruction are recorded in step S8 for the convenience of dependency analysis. A data structure may be utilized to record write instructions and read instructions of registers processed by the current instruction. Analyzer 31 determines if a register for receiving data write by the current instruction has been recorded in a data structure (step S10). If not, analyzer 31 generates a data structure to record the write register of the current instruction and records the current instruction as a write instruction of the register (step S18). The data structure may be stored in the main memory (not shown) of computer 100.

For example, analyzer 31 may utilize the following table 0 to record register r0 for receiving data write by instruction #0.

TABLE 0

| r0 | write instruction |
|    | read instructions |

The table is suitable for common register recording. If register r10 comprises red, green, blue, and alpha channels, the following Table 1 may be utilized to record read and write instructions of respective channels of register r10.

TABLE 1

| r10 | |
|---|---|
| R | write instruction |
|   | read instructions |
| G | write instruction |
|   | read instructions |
| B | write instruction |
|   | read instructions |
| A | write instruction |
|   | read instructions |

R, G, B, and A are respectively red, green, blue, and alpha channels of register r10. An instruction may access any channel of register r10. Similarly, analyzer 31 may utilize a similar data structure to record read registers (such as registers t0 and s0 of instruction #0) and write registers (or referred to as result register, such as register r0 of instruction #0) of the current instruction.

In step S10, if it is determined that the result register of the current instruction has been recorded, this may indicate that at least a former instruction has accessed the same register before the current instruction accesses the register. If so, analyzer 31 builds a dependency (including W-W or R-W dependencies) between the former instruction and the current instruction based on a first action and a second action respectively applied by the former and current instructions to the same result register. The previously described data structure (such as Table 1) may be utilized to determine which instruction is the former instruction accessing the same register before the current instruction. For example, since Table 0 records no instruction, instruction #0 is the first instruction accessing register r0.

Because instruction #0 writes the execution result to register r0, instruction #0 comprises the write instruction of register r0. After recording instruction #0, the data structure is shown as Table 2:

TABLE 2

| r0 | write instruction | #0 |
|    | read instructions |    |

When instruction #1 reads register r0, instruction #1 is a read instruction of register r0. Except for write instruction #0, Table 2 has no read instructions recorded therein until recording instruction #1 as a read instruction of register r0. Instruction #0 is the last instruction accessing register r0 before instruction #1 . A dependency is found between instructions #0 and #1 and classified as write-and-read (simplified as W-R) dependency. Additionally, dependencies between instructions further comprise a write-and-write (simplified as W-W) dependency and a read-and-write (simplified as R-W) dependency. For example, since instruction #1 applies a "write" operation to register r2, if an instruction #x writes data to register r2 prior to instruction #1, a W-W dependency exists between instructions #x and #1; if an instruction #x reads data from register r2 prior to instruction #1, an R-W dependency exists between instructions #x and #1. In other words, operations applied to a same register by a former and the current instructions are respectively referred to as a first action and a second action. If the first and second actions are respectively a writing operation and a reading operation, the dependency is a W-R dependency; if the first and second actions are both write operations, the dependency is a W-W dependency; and if the first and second actions are respectively a read operation and a write operation, the dependency is an R-W dependency. In the dependency, the former instruction is an upper level instruction of the current instruction, thus dependencies may be recorded and represented by another data structure, such as a tree structure.

Additionally, the data structure corresponding to the read register of the current instruction also records the current instruction as a read instruction of the read register. For example, instruction #1 is recorded as a read instruction in a corresponding table of the read register r0 of instruction #1, as shown in Table 3:

TABLE 3

| r0 | write instruction | #0 |
|----|-------------------|-----|
|    | read instructions | #1 |

In step S18, the current instruction is recorded as a write instruction in the data structure corresponding to the result register of the current instruction. If the data structure has stored another write instruction, the existing write instruction is replaced by the current instruction. If the data structure has stored one or more read instructions, the one or more read instructions are deleted. Removal of the former write and read instructions is for the convenience of identifying former instructions next time.

An example is given with reference to Table 4 which shows a condition before instruction #1 is recorded as a write instruction in the corresponding data structure of write register r2.

TABLE 4

| r2 | write instruction | #8       |
|----|-------------------|----------|
|    | read instructions | #10, #12 |

In Table 4, read instructions #10 and #12 have not been removed, indicating that read instructions #10 and #12 read register r2 after instruction #8 writes data to register r2. Thus, after instruction #1 is added to the data structure, analyzer 31 respectively builds R-W dependencies between instructions #10 and #1 and between #12 and #1, a W-W dependency between instructions #8 and #1, replaces instruction #8 in Table 4 by instruction #1, and deletes instructions #10 and #12 from Table 4, as shown in Table 5:

TABLE 5

| r2 | write instruction | #1 |
|----|-------------------|-----|
|    | read instructions |    |

An example is given with reference to Table 6 which shows a condition before instruction #1 recorded as a write instruction in the corresponding data structure of write register r2.

TABLE 6

| r2 | write instruction | #13 |
|----|-------------------|-----|
|    | read instructions |     |

Table 6 states that instruction #13 is the last data that writes instruction to register r2 before instruction #1 writes data to register r2. Thus, after instruction #1 is added to the data structure, analyzer 31 respectively builds a W-W dependency between instructions #13 and #1, and replaces instruction #13 in Table 4 by instruction #1, as shown in Table 7:

TABLE 7

| r2 | write instruction | #1 |
|----|-------------------|-----|
|    | read instructions |    |

Thus, in the determination step S10, if it is determined that a write instruction of the current instruction has been recorded, which may indicate that at least a former instruction has accessed the same result register before the current instruction, analyzer 31 builds a W-W dependency (step S12) or an R-W dependency (step S14) between each former instruction and the current instruction and calculates a dependency depth of the current instruction as the first dependency depth value (step S16). Because step S10 is for identifying write register of the current instruction, W-W and R-W dependencies are respectively built in steps S12 and S14 while W-R dependencies are built after step S20.

Examples are given in the following to describe calculation of dependency depth of the current instruction. When the current instruction has a plurality of upper level instructions, analyzer 31 selects one upper level instruction with the greatest dependency depth to serve as a reference for the dependency depth of the current instruction, applies a calculation on the greatest dependency depth, and utilizes the result of the calculation as the dependency depth of the current instruction, thus providing a difference between the dependency depths of the selected upper level instruction and the current instruction. For example, if dependency depth of each instruction is initialized to integer 0. The calculation may be an add operation, and the difference may be an integer 1. Note that the dependency depth of each instruction may be initialized to another value except for the integer 0 (such as the number of instructions in program 41), and the calculation may be another operation (such as subtraction) other than add operations.

Similar to step S10, analyzer 31 determines if a register read by the current instruction has been recorded in a data structure (step S20). If not, analyzer 31 generates a data structure to record the read register of the current instruction and records the current instruction as a read instruction of the register (step S28).

In step S20, if it is determined that the read register of the current instruction has been recorded in a data structure, this may indicate that a former instruction has accessed the same read register before the current instruction accesses the register. Thus, analyzer 31 builds a W-R dependency between the former instruction and the current instruction based on a first action and a second action applied to the same read register by the former and current instructions respectively (step S22), calculates dependency depth of the current instruction as the second dependency depth value utilizing an upper level instruction thereof (step S24) as previously described, and assigns the greater of the first and the second dependency depth values as the consequent dependency depth of the current instruction (step S26).

Because step S20 is for identifying read register of the current instruction, only W-R dependencies, rather than W-W and R-W dependencies, are built in steps S22. The order of two instructions with a read-and-read (simplified as R-R) dependency does not affect program execution accuracy, thus R-R dependencies are skipped.

Additionally, although result registers and read registers are respectively processed by steps S10~S18 and steps S20~S28 in FIG. 4, the order for performing steps S10~S18 and steps S20~S28 can be changed, or undertaken in parallel.

In step S28, analyzer 31 records the current instruction as a read instruction of the register in the data structure corresponding to the read register of the current instruction without deleting other existing read instructions or write instructions (step S28).

For example, a record as shown in Table 8 already exists before instruction #12 reads register r2.

TABLE 8

| r2 | write instruction | #8 |
|---|---|---|
|    | read instructions | #10 |

After a W-R dependency is built between instructions #8 and #12, since instruction #12 is recorded as a read instruction of register r2, and no existing read instruction or write instruction thereof requires clearing, thus providing a result as shown in Table 4.

Analyzer 31 determines if program 41 comprises any other instruction (step S30). If so, analyzer 31 retrieves another instruction as the current instruction to perform the described steps (step S2). If not, analyzer 31 outputs the analysis result (step S32).

Figure 5:
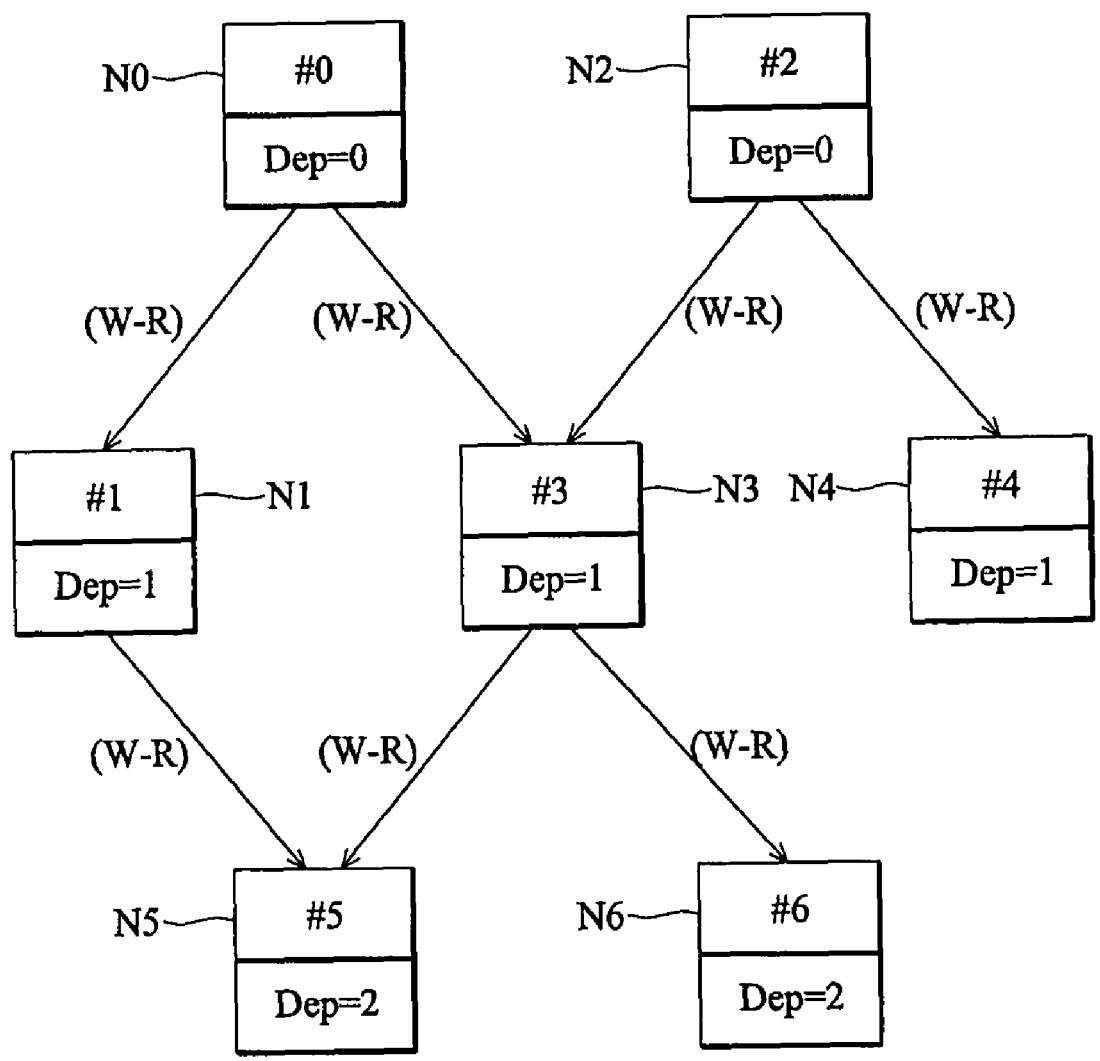
FIG. 5 is a schematic view showing an exemplary a corresponding data structure of the result of instruction dependency analysis.

By retrieving each instruction of program 41 In order as the current instruction to perform the described steps, analyzer 31 may generate a tree structure representing dependencies between all instructions of program 41, as shown in FIG. 5.

In FIG. 5, each node in the tree structure may comprise execution order, dependency depth (represented by parameter Dep), and other information of an instruction. Sorter 32, instruction removers 33 and 34 may utilize the tree structure to remove redundant instructions or redundant move instruction and to rearrange instruction.

Beginning from the output instruction of program 41, instruction remover 33 utilizes backward tracer 35 to trace back all upper level instructions, and records each traced instruction as a member of a first instruction group. If program 41 comprises an instruction not belonging to the first instruction group, instruction removers 33 removes the instruction from program 41.

Figure 6:
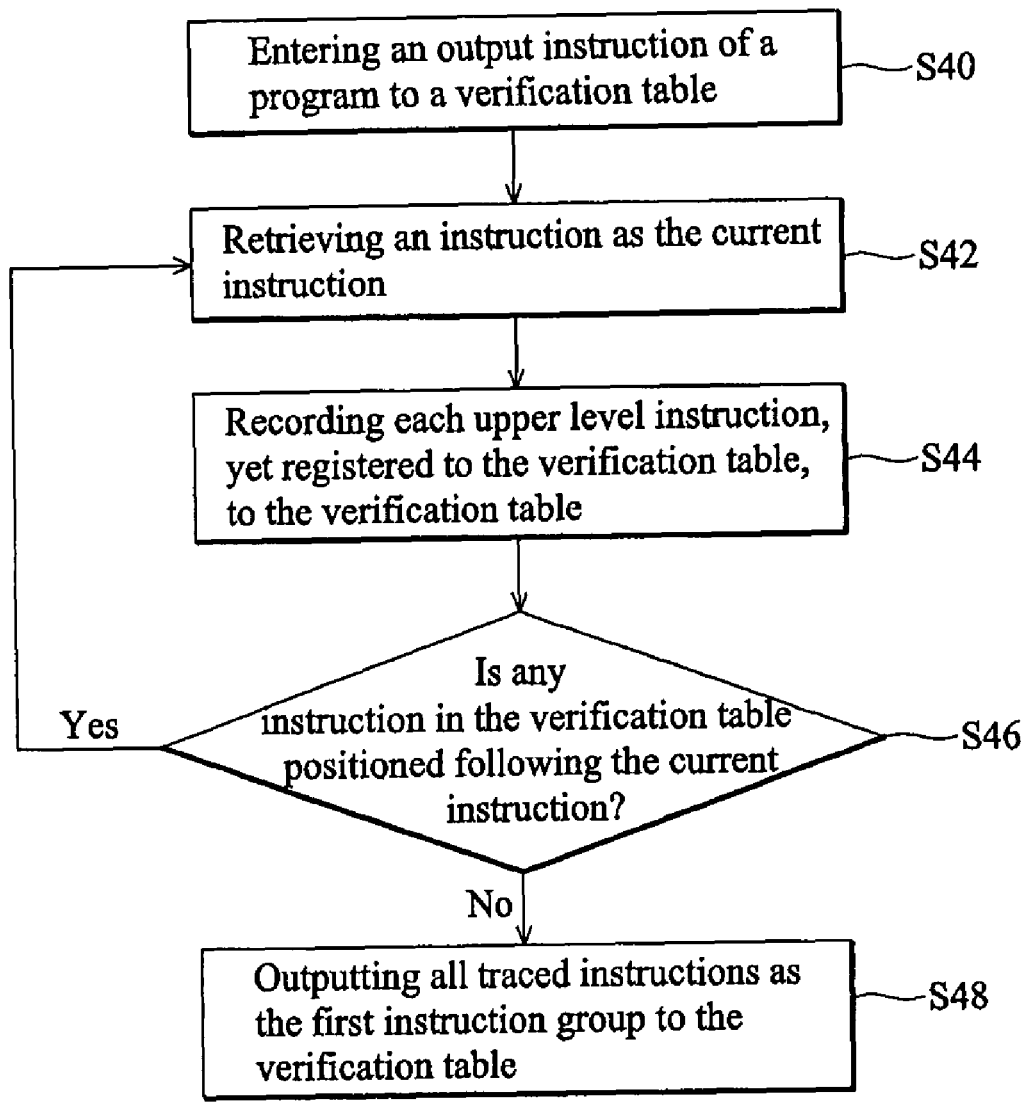
FIG. 6 is a flowchart showing an exemplary embodiment of backward tracing.

Operations of backward tracer 35 are described with reference to FIG. 6. Backward tracer 35 enters output instructions #5 and #6 of program 41 to a verification table (step S40), as shown in Table 9.

TABLE 9

| Verification Table | |
|---|---|
| Trace Order | Instruction Traced |
| 0 | #5, #6 |

From the traced instructions corresponding to trace order "0", backward tracer 35 retrieves instruction #5 as the current instruction (step S42) and records each upper level instruction, yet registered to the verification table, of the current instruction to the verification table (step S44), as shown in Table 10.

TABLE 10

| Verification Table | |
|---|---|
| Trace Order | Instruction Traced |
| 0 | #5, #6 |
| 1 | #5, #6, #1, #3 |

Per Trace Order 1, instructions #1 and #3, the upper level instructions of instruction #5, are recorded to the verification table. Backward tracer 35 determines if any instruction (such as instruction #6) in the verification table is positioned following the current instruction (step S46). If so, backward tracer 35 retrieves a next instruction as the current instruction to repeat the steps (step S42). If not, backward tracer 35 returns all traced instructions as the first instruction group to instruction removers 33 (step S48). Table 11 shows respective trace order processed by backward tracer 35 and the result thereof:

TABLE 11

| Verification Table | |
|---|---|
| Trace Order | Instruction Traced |
| 0 | #5, #6 |
| 1 | #5, #6, #1, #3 |
| 2 | #5, #6, #1, #3 |
| 3 | #5, #6, #1, #3, #0 |
| 4 | #5, #6, #1, #3, #0, #2 |
| 5 | #5, #6, #1, #3, #0, #2 |
| 6 | #5, #6, #1, #3, #0, #2 |

For each trace order in Table 11, an underlined instruction is the current instruction corresponding to the trace order. An instruction #4 in program 41 does not belong to the first instruction group, and is thus treated as a redundant instruction and deleted by instruction removers 33, the result of which is shown in the following:

0: texld r0, t0 s0
1: mov r2 r0
2: texld r1, t1 s1
3: mad r3, r0 c0 r1
5: mad oC0, r2 r3 c1
6: mov 0C1, r3

Figure 7:
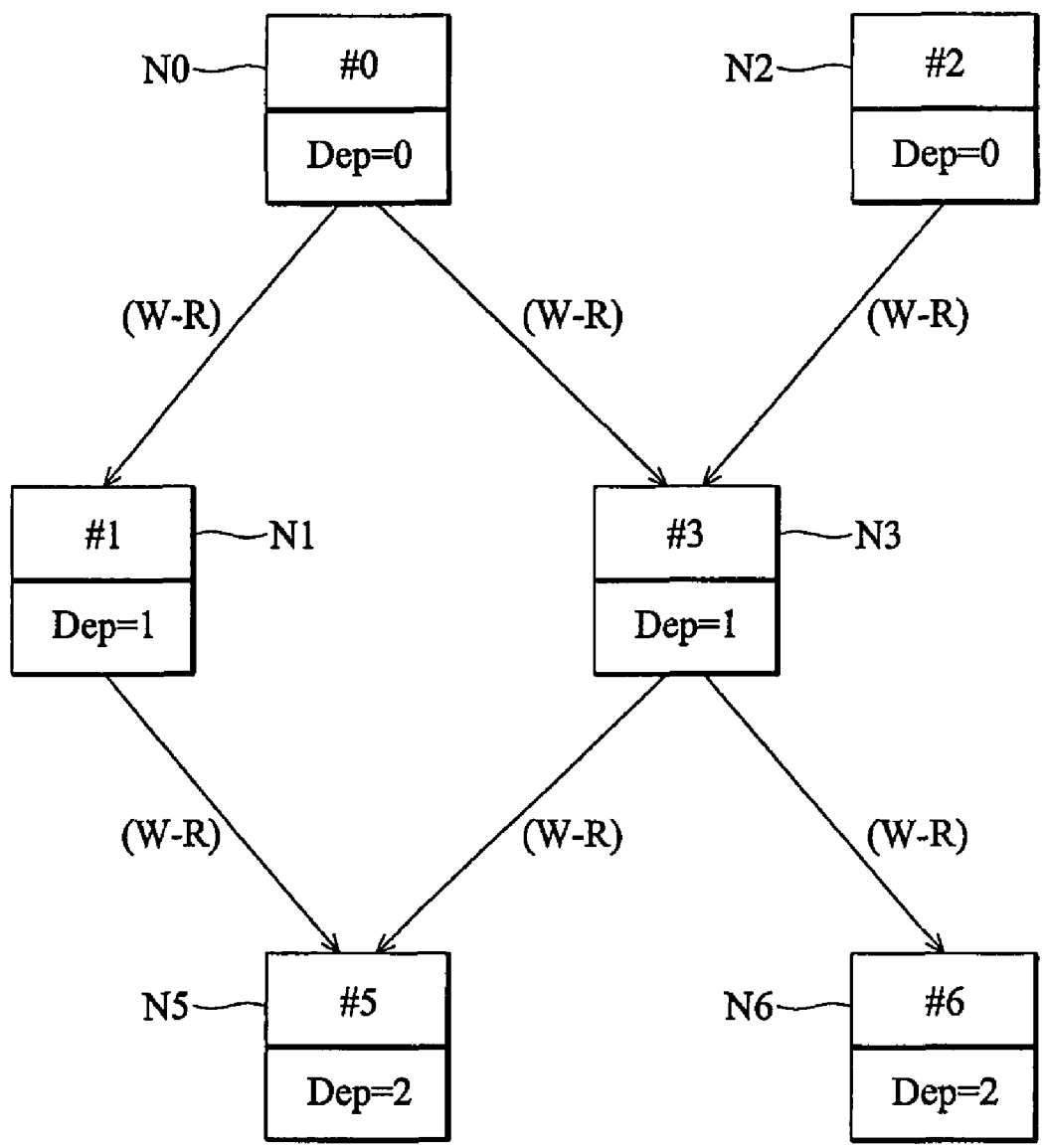
FIG. 7 is a schematic view showing a corresponding data structure of a program with a redundant instruction removed.

Instruction #4 has been removed. The corresponding data structure is shown in FIG. 7.

Figure 8:
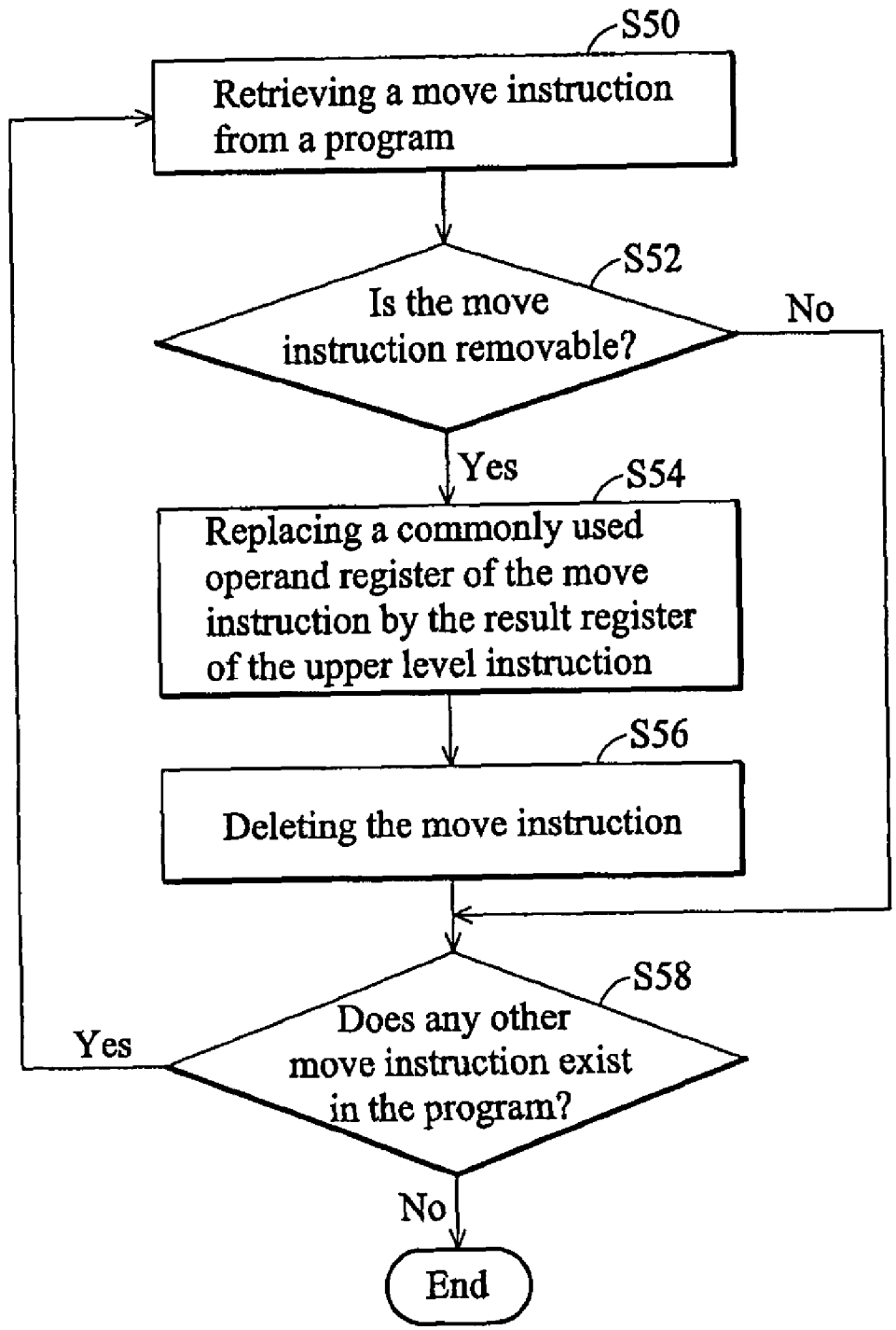
FIG. 8 is a flowchart showing an exemplary embodiment of a method for removing redundant move instructions.

With reference to FIG. 8, another exemplary embodiment of the method is provided. Instruction remover 34 retrieves a move instruction, such as instruction #1, from the program 41 utilizing a corresponding record containing instruction types (step S50) and determines if the move instruction can be deleted (step S52).

If a move instruction has an upper level instruction and a lower level instruction (such as upper level instruction #0 and lower level instruction #5 of instruction #1) and respectively a W-R dependency to the upper level instruction and the lower level instruction, the move instruction can be removed with no effect on program execution accuracy. In response to removal of the move instruction, instruction remover 34 modifies the lower level instruction of the move instruction. Specifically, instruction remover 34 utilizes the result register (such as the result register r0 of instruction #0 ) of the upper level instruction of the move instruction to replace an operand register commonly used by the move instruction and the lower level instruction thereof (such as the original read register r2 of instruction #5) (step S54). The replaced commonly used operand register is the result register of the removed instruction. After the move instruction is deleted, instruction remover 34 generates a new dependency between the upper level instruction and the lower level instruction.

Instruction remover 34 deletes the move instruction (such as instruction #1 ) (step S56), and determines if any other move instruction exists in program 41 (step S58). If not, operations of instruction remover 34 are terminated. If so, another move instruction is retrieved, and the described steps are applied thereto. Program 41 with an instruction removed by instruction remover 34 is shown in the following:

0: texld r0, t0 s0
2: texld r1, t1 s1
3: mad r3, r0 c0 r1
5: mad oC0, r0 r3 c1
6: mov 0C1, r3

Figure 9:
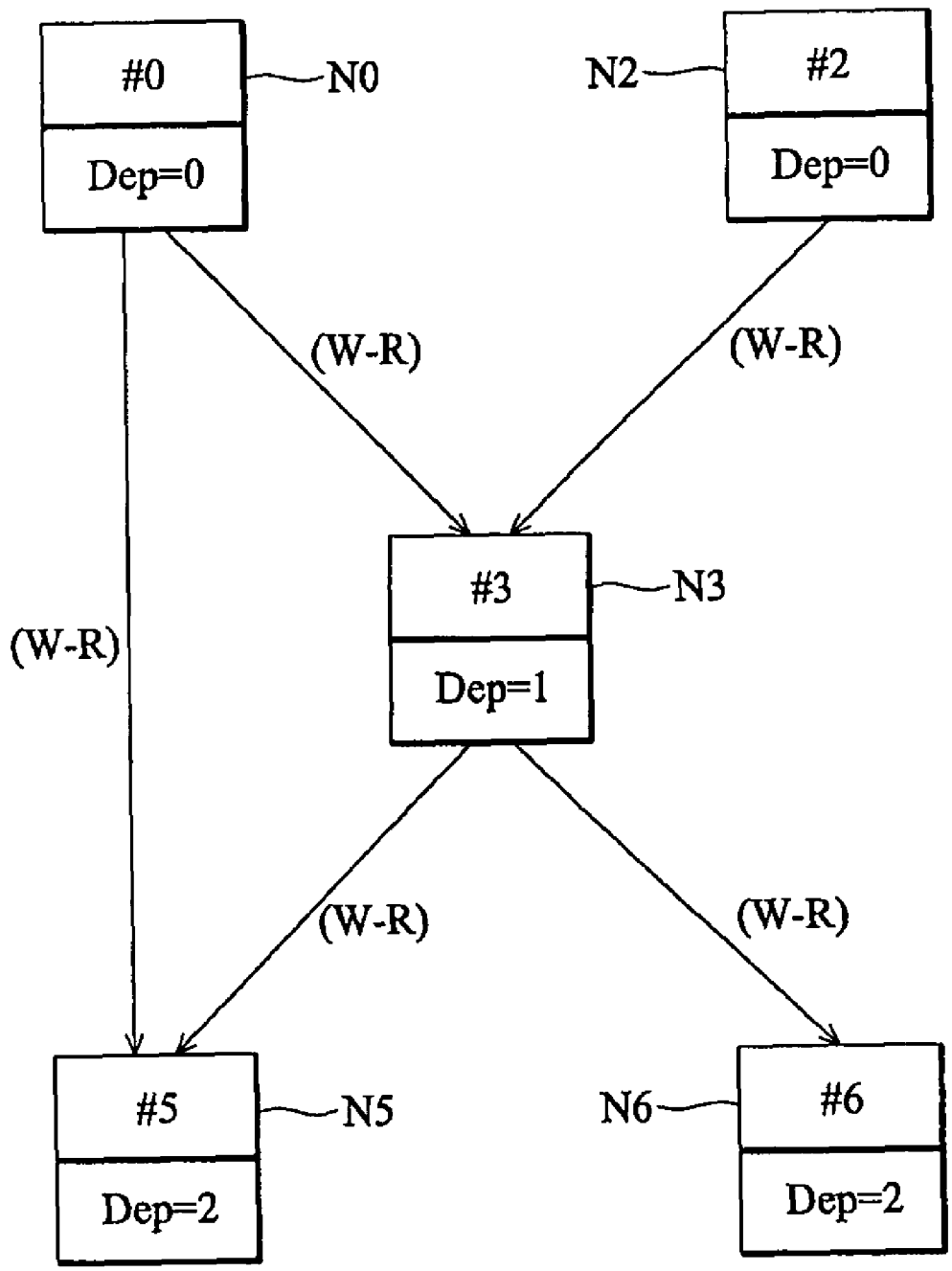
FIG. 9 is a schematic view showing a corresponding data structure of a program with a redundant move instruction removed.

Instruction #1 has been removed therefrom, and an original read register r2 of instruction #5 is replaced by register r0. A corresponding tree structure of the result is shown in FIG. 9.

The order in which instruction removers 33 and 34 execute may be arranged in various ways. In addition to unnecessary instruction deleted by instruction removers 33 and 34, sorter 32 may process resultant instructions output by instruction remover 33 or/and 34. Sorter 32 utilizes a stable sorting algorithm, such as merge sort, to arrange instructions in program 41 according to respective dependency depth thereof.

For comparison of the difference resulting from the sorting, the program 41 output by instruction remover 33 is input to sorter 32. The program after sorting by sorter 32 is shown in the following:

0: texld r0, t0 s0
2: texld r1, t1 s1
1: mov r2 r0
3: mad r3, r0 c0 r1
5: mad oC0, r2 r3 c1
6: mov 0C1, r3

Instruction #2 is placed in front of instruction #1 . Because there is no dependency between instructions #1 and #2, two instructions can be successively executed in the pipeline of the processor without suspending execution for the instruction #2.

Sorter 32, instruction removers 33 and 34 may be executed respectively or functions thereof may be respectively applied to program 41 without affecting accuracy of the program. Thus, a program 41 output by any one of sorter 32, instruction remover 33 or 34 may be fetched and executed by computer 100.

In conclusion, the method, when applied to a program providing functional operations (such as shading), analyzes dependencies between instructions according to actions applied thereby to registers, removes redundant instructions from the program, adjust the order of instructions, and fetches the adjusted program to a computer, thus to improve execution efficiency of the operations.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A program instruction rearrangement method in computer, comprising:
retrieving a program to be executed by a computer from a storage device;
retrieving an instruction in the program as the current instruction and retrieving a register used by the current instruction and a first action applied to the register by the current instruction;
if another instruction, hereafter referred to as the second instruction, applying a second action on the same register before the first action, building a dependency between instructions of the program based register access order by the current instruction and the second instruction;
calculating dependency depth of each instruction in the program;
assigning the second instruction applying the second action as an upper level instruction of the current instruction;
performing a calculation based on the dependency depth of an upper level instruction comprises the greatest dependency depth and assigning the result of the calculation as the dependency depth of the current instruction, thus to provide a preset difference between the dependency depths of the current instruction and the upper level instruction; and
rearranging instructions in the program based on the dependency depth of each instruction thereof.

2. The method as claimed in claim 1, further comprising storing a corresponding record indicating the current instruction type, comprising a beginning instruction, an output instruction, or a move instruction, wherein the output instruction is the instruction outputting a final execution result of the program.

3. The method as claimed in claim 1, further comprising an initialization process for providing initial dependency depth of the current instruction.

4. The method as claimed in claim 1, wherein the instructions in the program are rearranged by a stable sorting algorithm.

5. The method as claimed in claim 1, further comprising:
beginning to trace back all upper level instructions in order and setting any traced instruction as a member of an instruction group; and
deleting an instruction not belonging to the instruction group from the program.

6. The method as claimed in claim 1, wherein when the second and first actions are respectively writing and reading operations, the dependency is classified as a write-and-read dependency, when the second and first actions are respectively write operations, the dependency is classified as a write-and-write dependency, and when the second and first actions are respectively read and write operations, the dependency is classified as a read-and-write dependency.

7. The method as claimed in claim 6, further comprising:
retrieving a move instruction based on a corresponding record containing an instruction type of the move instruction;
if the move instruction comprises an upper level instruction and a lower level instruction, respectively with the write-and-read dependency to the move instruction, replacing an operand register of the lower level instruction of the move instruction by a result register of the upper level instruction of the move instruction; and
deleting the move instruction from the program.

8. The method as claimed in claim 1, further comprising fetching the rearranged instructions in the program to the computer for execution.

9. A program instruction rearrangement method in computer, comprising:
- retrieving a program to be executed by a computer from a storage device;
- retrieving an instruction in the program as the current instruction;
- if another instruction, hereafter referred to as the second instruction, applying a second action on a register before the current instruction applying a first action on the same register, building a dependency between the second instruction and the current instruction in which the second instruction is assigned as an upper level instruction of the current instruction;
- after retrieving each instruction of the program in order as the current instruction and accordingly building a dependency thereof, beginning to trace back all upper level instructions in the program, and setting any traced upper level instruction as a member of an instruction group;
- deleting an instruction not belonging to the instruction group from the program;
- utilizing a data structure to record a read instruction and a write instruction of the register;
- when the first action is a reading operation, recording the current instruction as a first read instructions of the register in the data structure, and if the data structure comprises a write instruction of the register before recording the first read instructions, assigning the dependency as a write-and-read dependency;
- when the first action is a writing operation, recording the current instruction as a first write instruction of the register in the data structure, and if the data structure comprises a write instruction and no read instruction of the register before recording the first write instruction, assigning the dependency as a write-and-write dependency and removing instructions stored before the first write instruction from the data structure;
- if the data structure comprises one or more read instructions of the register before recording the first write instruction, respectively builds a dependency between the current instruction and each of the one or more read instructions as a read-and-write dependency and clearing the one or more read instructions stored in the data structure; and
- if the data structure comprises one or more read instructions and a second write instruction of the register before recording the current instruction as the first write instruction, removing the second write instruction from the data structure.

10. The method as claimed in claim 9, further comprising fetching the program without the deleted instruction to the computer for execution.

11. A program instruction rearrangement method, comprising:
- retrieving a program to be executed by a computer from a storage device;
- retrieving an instruction in the program as the current instruction and retrieving a register utilized by the current instruction;
- if another instruction, referred to as the second instruction, accesses the same register before the current instruction accesses the register, building a dependency between instructions of the program based on the order in which the current instruction and the second instruction access the register;
- removing a redundant move instruction from the program based on the dependency;
- if the second instruction in the program accesses a register before the current instruction accesses the same register, building a dependency between the second instruction and the current instruction based on a first action and a second action respectively applied by the second and current instruction to the register, wherein the second instruction is assigned as an upper level instruction of the current instruction, and when the first and second actions respectively comprise a writing operation and a reading operation, the dependency comprises a write-and-read dependency;
- if the current instruction is a move instruction and has a lower level instruction, and dependency between the move instruction and the upper level instruction or the lower level instructions thereof are both write-and-read dependencies, replacing an operand register of the lower level instruction of the move instruction by a result register of the upper level instruction of the move instruction, wherein the operand register is identical to the result register of the move instruction; and
- deleting the move instruction from the program.

12. The method as claimed in claim 11, further comprising:
- if the current instruction is a move instruction, storing a corresponding record containing that the current instruction is a move instruction; and
- retrieving the move instruction based on the corresponding record.

13. The method as claimed in claim 11, further comprising: building a dependency between the upper and lower level instructions of the move instruction.

* * * * *